(12) United States Patent
Valera

(10) Patent No.: US 11,906,743 B2
(45) Date of Patent: Feb. 20, 2024

(54) DISPLAY FOR AUGMENTED REALITY OR VIRTUAL REALITY

(71) Applicant: Snap Inc., Santa Monica, CA (US)

(72) Inventor: Mohmed Salim Valera, Abingdon (GB)

(73) Assignee: Snap Inc., Santa Monica, CA (US)

( * ) Notice: Subject to any disclaimer, the term of this patent is extended or adjusted under 35 U.S.C. 154(b) by 189 days.

(21) Appl. No.: 17/432,036

(22) PCT Filed: Jan. 20, 2020

(86) PCT No.: PCT/GB2020/050104
§ 371 (c)(1),
(2) Date: Aug. 18, 2021

(87) PCT Pub. No.: WO2020/178545
PCT Pub. Date: Sep. 10, 2020

(65) Prior Publication Data
US 2022/0179212 A1    Jun. 9, 2022

(30) Foreign Application Priority Data

Mar. 7, 2019  (GB) ..................... 1903037

(51) Int. Cl.
G02B 27/01     (2006.01)
G02B 27/00     (2006.01)
G02B 27/10     (2006.01)

(52) U.S. Cl.
CPC ..... *G02B 27/0172* (2013.01); *G02B 27/0056* (2013.01); *G02B 27/1006* (2013.01)

(58) Field of Classification Search
CPC ............ G02B 27/0172; G02B 27/0056; G02B 27/1006
See application file for complete search history.

(56) References Cited

U.S. PATENT DOCUMENTS 10,451,799 B2    10/2019  Klug et al.
2006/0228073 A1*  10/2006  Mukawa ................. G02B 5/18
                                                                385/31
(Continued)

FOREIGN PATENT DOCUMENTS

WO       2016113528        7/2016
WO   WO-2020178545 A1     9/2020

OTHER PUBLICATIONS

International Search Report and Written Opinion dated Jul. 23, 2020 for international application PCT/GB2020/050104.
(Continued)

*Primary Examiner* — Kenneth B Lee, Jr.
(74) *Attorney, Agent, or Firm* — Schwegman Lundberg & Woessner, P.A.

(57) ABSTRACT

An augmented reality or virtual reality display device is disclosed. A first input grating (6; 106; 306; 406; 506) is provided on a waveguide assembly to receive light from a first projector (2; 102; 202; 302; 402; 502) and to couple the light into the at least one waveguide. A second input grating (116; 316; 416; 516) is provided to receive light from a second projector (12; 112; 212; 312; 412; 512) and couple the light into the at least one waveguide. An output diffractive optical element couples light out of the at least one waveguide towards a notional viewing position. The first projector provides light to the first input diffractive optical element in a direction that is at a first angle to a waveguide normal vector, and the second projector is configured to provide light to the second input diffractive optical element in a direction that is at a second angle to the waveguide normal vector. The output diffractive optical element is configured to couple light out of the at least one waveguide in a first range of angles for light from the first projector and in a second range of angles for light from the second
(Continued)

projector, wherein the first range of angles and the second range of angles are different but are partially overlapping.

20 Claims, 14 Drawing Sheets

(56) References Cited

U.S. PATENT DOCUMENTS

| | | | |
|---|---|---|---|
| 2010/0296163 A1 | 11/2010 | Saarikko | |
| 2011/0019874 A1* | 1/2011 | Jarvenpaa | A61B 3/113 |
| | | | 382/103 |
| 2018/0188542 A1 | 7/2018 | Waldern et al. | |
| 2018/0210146 A1* | 7/2018 | Klug | G02B 6/02085 |
| 2018/0232048 A1 | 8/2018 | Popovich et al. | |
| 2018/0275411 A1* | 9/2018 | Schowengerdt | G02B 6/0016 |
| 2018/0299678 A1* | 10/2018 | Singer | G02B 6/005 |
| 2020/0271932 A1* | 8/2020 | Tuomisto | G02B 27/0944 |

OTHER PUBLICATIONS

"International Application Serial No. PCT/GB2020/050104, International Preliminary Report on Patentability dated Sep. 16, 2021", 13 pgs.
"International Application Serial No. PCT/GB2020/050104, Invitation to Pay Additional Fees dated Apr. 21, 2020", 11 pgs.

* cited by examiner

DISPLAY FOR AUGMENTED REALITY OR VIRTUAL REALITY

This application is a national stage filing under 35 U.S.C. § 371 of International Patent Application No. PCT/GB2020/050104, filed Jan. 20, 2020, which claims priority to Great Britain Application No. 1903037.8, filed Mar. 7, 2019, each of which is incorporated by reference herein in its entirety.

The present invention relates to a display for augmented reality and virtual reality applications.

In an augmented reality headset a transparent waveguide is provided in front of a user's eye or eyes. A light projector transmits light towards the waveguide. Light can be coupled into the waveguide by an input diffraction grating. Light then propagates within the waveguide by total internal reflection and an output diffraction grating couples light out of the waveguide and towards a viewer. In use, a viewer can see light from their external environment, transmitted through the transparent waveguide, as well as projected light from the projector. This can provide an augmented reality experience. A virtual reality headset works in a similar way, except that the user can only see projected light, and cannot see any light from their external environment.

One challenge in the field of augmented reality and virtual reality displays is to provide wide field-of-view polychromatic images so that augmented reality images can be positioned at any conceivable position within the user's field-of-view. To date, many augmented reality systems have been effective only at positioning augmented reality images towards the centre of the user's vision or within specific angular limits. Further, it is desirable to position projectors and electronics so that there is minimum interference with a user's peripheral vision and minimum obscuration of a user's face.

An object of the present invention is to address and overcome some of these issues.

According to an aspect of the invention there is provided an augmented reality or virtual reality display device, comprising: a first projector and a second projector; a waveguide assembly, comprising at least one waveguide; a first input diffractive optical element positioned in or on the waveguide assembly configured to receive light from the first projector and to couple the light into the at least one waveguide; a second input diffractive optical element positioned in or on the waveguide assembly configured to receive light from the second projector and to couple the light into the at least one waveguide; an output diffractive optical element positioned in or on the waveguide assembly configured to couple light out of the at least one waveguide towards a notional viewing position; wherein the first projector is configured to provide light to the first input diffractive optical element in a direction that is at a first angle to a waveguide normal vector, and the second projector is configured to provide light to the second input diffractive optical element in a direction that is at a second angle to the waveguide normal vector; wherein the output diffractive optical element is configured to couple light out of the at least one waveguide in a first range of angles for light from the first projector and in a second range of angles for light from the second projector, wherein the first range of angles and the second range of angles are different but are partially overlapping.

In this way, the device can stitch together overlapping angular fields of view from the first and second projectors. A viewer preferably cannot distinguish the light from the first and second projectors, and therefore they are provided with an enhanced field of view in a range of continuous viewing angles that include the first and second range of angles. This is achieved by angling the first and second projectors at carefully selected different angles with respect to the waveguide normal vector, which produces different angular outputs in the light from the output diffractive optical element.

In some embodiments different optical paths can be provided for light from the first and second projectors within the same waveguide. This is achieved by providing dedicated input diffractive optical elements for each projector on either side of the output diffractive optical element. It is advantageous to provide different optical paths in order to provide separate channels and to minimise interference between the channels.

Preferably the display device comprises a first waveguide assembly and a second waveguide assembly, respectively comprising at least one waveguide. The first input diffractive optical element is preferably configured to couple light from the first projector into the at least one waveguide in the first waveguide assembly. The second input diffractive optical element may be configured to couple light from the second projector into the at least one waveguide in the second waveguide assembly. In this way, the first and second waveguide assemblies can provide different viewing properties for a user. Each waveguide assembly, or waveguide stack, may be dedicated to deal with light from a specific projector. The first waveguide assembly may therefore provide light to the user in the first range of angles and the second waveguide assembly may provide light to the user in the second range of angles. In other embodiments the first and second range of angles may be provided within a shared waveguide.

The first waveguide assembly may be a stack of waveguides and there may be a plurality of first input diffractive optical elements respectively positioned in or on each waveguide in the stack of waveguides. The first projector may be configured to provide a plurality of wavelengths of light which are coupled by the plurality of first input diffractive optical elements into the stack of waveguides. This can allow the device to display colour augmented reality images by coupling three primary colours through two or three waveguides. Each of the first input diffractive optical elements in the stack of waveguides can have properties that are designed to couple a particular primary colour into the relevant waveguide. Generally this is achieved by careful selection of the period of the diffraction grating so that light of a particular wavelength is preferentially diffracted by the relevant grating and coupled into the relevant waveguide to be totally internally reflected therein.

The second waveguide assembly may be a stack of waveguides and there may be a plurality of second input diffractive optical elements respectively positioned in or on each waveguide in the stack of waveguides. The second projector may be configured to provide a plurality of wavelengths of light which are coupled by the plurality of second input diffractive optical elements into the stack of waveguides. In this way, a stack of waveguides can be provided for each projector so that coloured light can be provided in the first and second range of angles.

In some embodiments there may be a third projector configured to provide light to the input diffractive optical element in a direction that is at a third angle to a waveguide normal vector. The output diffractive optical element may be configured to couple light out of the at least one waveguide in a third range of angles for light from the third projector, wherein the second range of angles and the third range of angles are partially overlapping. The third range of angles is preferably different and distinguishable from the first range of angles and the second range of angles. In this way, the second range of angles can be partially overlapping with both the first range of angles and the third range of angles. However, the first range of angles is preferably non-overlapping with the third range of angles. Preferably the second range of angles includes angles between the first and third ranges of angles so that, together, a continuous range of viewing angles are provided between the limits of the first and third ranges of angles. This allows the device to stitch together individual fields of view in order to provide an effective field of view that occupies nearly the full range of a viewer's vision.

The first and second range of angles, and the second and third range of angles may be partially overlapping in at least one dimension. Preferably the at least one dimension is a horizontal dimension from the perspective of a user wearing the device. Typically a human has a wider horizontal field of view in comparison to their vertical field of view. Therefore, the stitching together of partially overlapping ranges of angles is generally of greater utility in enhancing horizontal field of view. However, in some embodiments vertical fields of view may be stitched together so that the at least one dimension may be a vertical dimension from the perspective of a user wearing the device.

The first and second projectors may be positioned so that they provide light directly to first and second waveguide assemblies. In this sense, preferably there is substantially no diffraction of light from the first and second projectors before it is received at the first and second input diffractive optical elements. Preferably the third projector is also positioned to provide light directly to a third input diffractive optical element in or on the third waveguide assembly.

The first and second input diffractive optical elements may be offset from one another in the first and second waveguide assemblies so that light can be coupled directly from the first and second projectors to the first and second input diffractive optical elements respectively. In other words, the surface normal vectors of the first and second waveguide assemblies, at the respective positions of the first and second input diffractive optical elements are preferably offset from one another.

Preferably the third input diffractive optical element is offset from both the first and second input diffractive optical elements. This can allow the light from the third projector to be directly coupled to the third diffractive optical element without experiencing any cross-channel interference from the first or second diffractive optical elements.

In one arrangement the ends of the first, second and third waveguide assemblies may be offset from one another in a stepped arrangement. This can allow the first, second and third projectors to be positioned adjacent one another, but to allow light from the projectors to propagate unimpeded to the relevant input diffractive optical element on the relevant waveguide assembly. This can improve the optical output by coupling light from the first, second and third projectors along dedicated paths, and by minimising cross-talk between the relevant paths.

The first and second input diffractive optical elements may be positioned in or on the waveguide assembly on either side of the output diffractive optical element. In this way, the first input diffractive optical element can couple light from the first projector towards the output diffractive optical element in a first direction and the second input diffractive optical element can couple light from the second projector towards the output diffractive optical element in a second direction, which may be opposite to the first direction. This can improve the compactness of the device because the dedicated optical paths for light from the first and second projectors can be provided within a single waveguide assembly. This can advantageously reduce the thickness and weight of the device.

In one arrangement the first and second projectors can be provided adjacent the first and second input diffractive optical elements. However, this can be disadvantageous in some embodiments because it may be preferred to group the various projectors or light engines in a single location, where they cause minimum interference to a user's peripheral vision of the real world. In some embodiments there may be a periscope for coupling light from the first projector to the first input diffractive optical element so that the first projector and the second projector can be positioned on the same side of the output diffractive optical element. The periscope can allow light from the first projector to be coupled into the waveguide assembly along an optical path that is separated from the optical path of the second projector. However, both the first and second projectors can be located on the same side of the waveguide assembly to improve headset design. Advantageously, this can allow projectors to be positioned to the side of a user's head, adjacent their temple, in an augmented reality device, since there is more space at this position. In addition, grouping projectors together provides reduced impairment to a user's peripheral vision of the real world.

The periscope preferably includes reflective surfaces that are angled with respect to light from the first projector. The angled reflective surfaces may be positioned with respect to a waveguide so that light is totally internally reflected within the waveguide between the reflective surfaces.

The first and second input diffractive optical elements may be positioned above and below the output diffractive optical element from the perspective of a user. The first and second input diffractive optical elements may be positioned to the left and right of the output diffractive optical element from the perspective of a user. In this way, the device can stitch together fields of view in order to provide an enhanced vertical field of view or an enhanced horizontal field of view.

In some arrangements there may be a third projector and a fourth projector, and a third input diffractive optical element and a fourth input diffractive optical element. The third and fourth input diffractive optical elements may be positioned above and below the output diffractive optical element from the perspective of a user. In this way, four separate optical paths can be provided within a single waveguide assembly, stitching together fields of view in the horizontal and vertical planes. This can provide a much improved effective field of view for a user.

The first and second angles may be angled respectively away from the output diffractive optical element. This has been found to be advantageous in maximising the available field of view in the first and second ranges of angles.

In some arrangements the display device may comprise a prism positioned between the first projector and the waveguide assembly to reduce the spread of angles of light rays from the first projector where they encounter the waveguide assembly. A similar prism may be provided between second, third and subsequent projectors in order to reduce the refractive spread of angles where they encounter the waveguide assembly, thereby decreasing the physical size of input diffraction optical elements.

Embodiments of the invention are now described, by way of example, with reference to the drawings, in which.

Figure 1:
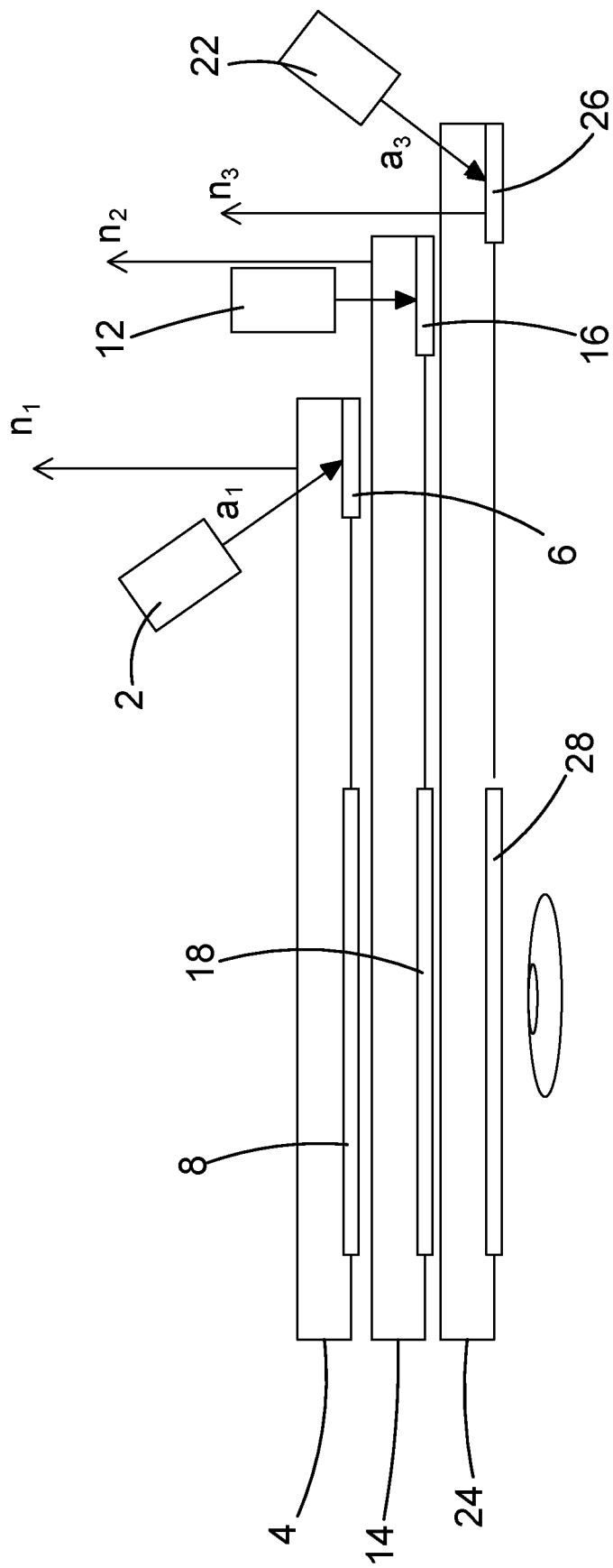
FIG. 1 is a schematic side view of an optical set up in an augmented reality display in an embodiment of the invention.

FIG. 1 is a schematic side view of an optical set up in an augmented reality display. The display comprises a first input projector 2 and a first waveguide stack 4. The display also includes a second input projector 12, a second waveguide stack 14, a third input projector 22 and a third waveguide stack 24.

The first waveguide stack 4 includes an input grating 6 and an output structure 8, which may be a photonic crystal or crossed gratings, as described in WO2016/020643. As such, the output structure 8 can receive light that is totally internally reflected within the waveguide and can provide two-dimensional expansion while simultaneously outcoupling light from the waveguide so that it can be viewed by a user.

The second waveguide stack 14 also includes an input grating 16 and an output structure 18, and the third waveguide stack 24 includes an input grating 26 and an output structure 28. The first, second and third waveguide stacks 4, 14, 24 have surface normal vectors, $n_1$, $n_2$, $n_3$ which are parallel to one another, but which are offset from one another at the location of the respective input gratings 6, 16, 26. The first projector 2 is configured so that its projected beam of light subtends an angle $a_1$ to the waveguide normal vector, $n_1$. The angle $a_1$ is within the range of 5-25 degrees, measured in a counter-clockwise direction from the waveguide normal vector, $n_1$. Using different terminology, the angle $a_1$ may be expressed as a negative angle in the range from −25 degrees to −5 degrees. The input grating 6 receives and diffracts light from the first projector 2. The diffracted light travels within the first waveguide stack 4 by total internal reflection towards the output structure 8. Light is coupled out of the first waveguide stack 4 by the output structure 8 in order to provide augmented reality or virtual reality images. The output structure 8 provides augmented reality images within a first range of angles.

Figure 2A:
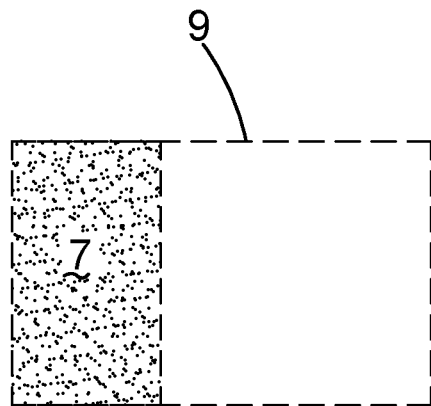
FIG. 2A is a diagram showing the angular field of view for light emanating from the first projector shown in FIG. 1.

FIG. 2A is a diagram showing the first range of angles 7 which are provided from the output structure 8 in the first waveguide stack 4. The user's complete field of view is shown as a rectangle 9 with a vertical range of 48 degrees and a horizontal range of 75 degrees. From a practical perspective, this represents the effective range of a human's visible field of view, without turning their head. The first range of angles 7 is provided towards the left of the visible field of view, with a vertical angular range of ±24 degrees and a horizontal angular range between around −37 degrees and −5 degrees. In this way, the first projector 2 can position augmented reality images within the first range of angles 7, which are provided towards the left hand side of the user's field of view 9.

The second projector 12 is configured to direct its projected beam of light in a direction that is substantially parallel to the waveguide normal vector, $n_2$. In other words, the angle between the beam and the waveguide normal vector, $n_2$, is approximately 0 degrees. The input grating 16 receives and diffracts light from the second projector 12. The diffracted light travels within the second waveguide stack 14 by total internal reflection towards the output structure 18. Light is coupled out of the second waveguide stack 14 by the output structure 18 in order to provide augmented reality or virtual reality images.

Figure 2B:
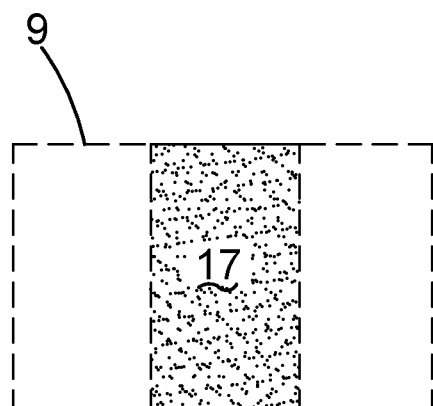
FIG. 2B is a diagram showing the angular field of view for light emanating from the second projector shown in FIG. 1.

FIG. 2B is a diagram showing the second range of angles 17 which are provided from the output structure 18 in the second waveguide stack 14. The second range of angles 17 is provided centrally within the user's field of view, with a vertical angular range of ±24 degrees and a horizontal angular range between around ±16 degrees. The second range of angles 17 is therefore partially overlapping with the first range of angles 7 between −5 degrees and −16 degrees.

The third projector 22 is configured to direct light so that the beam of light from the third projector subtends an angle $a_3$ to the waveguide normal vector, $n_3$. The angle $a_3$ is within the range of 5-25 degrees, measured in a clockwise direction from the waveguide normal vector. The input grating 26 receives and diffracts light from the third projector 22. The diffracted light travels within the third waveguide stack 24 by total internal reflection towards the output structure 28. Light is coupled out of the third waveguide stack 24 by the output structure 28 in order to provide augmented reality or virtual reality images.

Figure 2C:
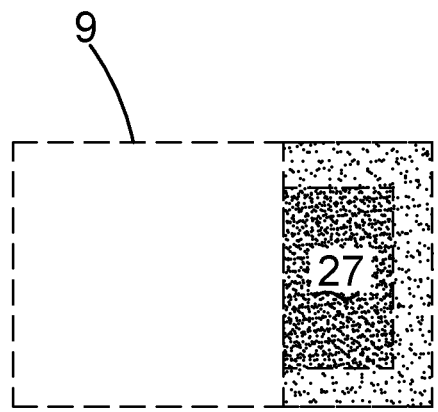
FIG. 2C is a diagram showing the angular field of view for light emanating from the third projector shown in FIG. 1.

FIG. 2C is a diagram showing the third range of angles 27 which are provided from the output structure 28 in the third waveguide stack 24. The third range of angles 27 is provided to the right of the user's field of view. The third range of angles 27 has a reduced horizontal and vertical range in comparison to the first and second ranges of angles 7, 17 due to the fact that the third projector 22 is angled to project light toward the third output structure 28, rather than away from it (as is the case with the first projector 2). The third range of angles 27 is partially overlapping with the second range of angles 17. It should be noted, however, that the third range of angles 27 and the first range of angles 7 are non-overlapping.

Each of the first, second and third waveguide stacks 4, 14, 24 respectively comprise three separate waveguides for respective primary colours. Taking the first waveguide stack 4 as an example, a full colour display can be provided by using three distinct waveguides in a stack, each waveguide made of high index (n~1.7) glass. Each waveguide in the stack is similar in structure, and each waveguide includes an input grating 6 and an output structure 8. However, the properties of the respective input gratings 6 and output structures 8 are different in the different waveguide layers. In a first waveguide layer (not shown) the input grating 6 and the output structures 8 are provided with a pitch of between 240 nm and 300 nm. In a second waveguide layer (not shown) the input grating 6 and the output structures 8 are provided with a pitch of between 280 nm to 360 nm. In a third waveguide layer (not shown) the input grating 6 and the output structures 8 are provided with a pitch of between 330 nm and 420 nm. The pitch of a grating corresponds to the separation of diffractive features. This corresponds to the separation of grooves in the input grating.

The first projector 2 directs polychromatic light towards the first waveguide stack 4. The first layer in the first waveguide stack 4 preferentially diffracts red wavelengths of light and couples these red wavelengths into the first layer. Green and blue wavelengths are generally transmitted by the first layer in the waveguide stack 4. The input grating in the second layer in the first waveguide stack preferentially diffracts green light so that these wavelengths can be coupled into the second layer. Blue wavelengths are transmitted and are preferentially coupled into the third layer of the waveguide stack 4 by an input grating that is optimised for blue light. Each waveguide layer has an output element 8 with a grating pitch that is optimised to couple the relevant wavelength out of the waveguide layer and towards a user. In this way, each waveguide layer can be optimised for blue, green and red respectively so that, collectively, a full colour output can be provided.

Figure 3:
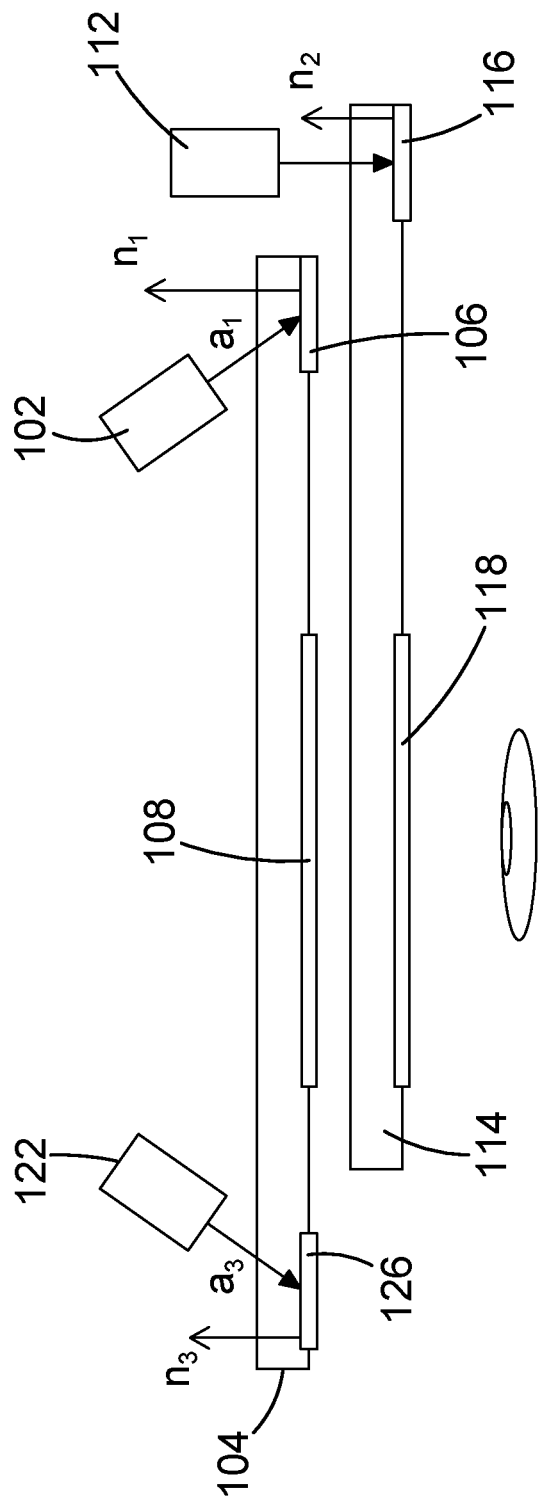
FIG. 3 is a schematic side view of an optical set up in an augmented reality display in another embodiment of the invention.

FIG. 3 is a schematic side view of an optical set up in another configuration for use in an augmented reality display. In this arrangement there are only two waveguide stacks: a first waveguide stack 104 and a second waveguide stack 114. The first and second projectors 102, 112 are positioned in a substantially similar manner to the arrangement depicted in FIG. 1. However, in this configuration the third projector 122 is directed towards an input grating 126 that is positioned in or on the first waveguide stack 104. The input grating 126 is positioned on the opposite side of the output structure 108 to the input grating 106 that receives light from the first projector 102.

The third projector 122 is configured to direct light so that the beam of light subtends an angle $a_3$ to the waveguide normal vector, $n_3$. The angle $a_3$ is within the range of 5-25 degrees, measured in a clockwise direction from the waveguide normal vector. However, unlike the embodiment shown in FIG. 1, the third projector 122 is angled away from the output structure 108 (whereas it is angled towards the output structure 28 in the arrangement of FIG. 1). The input grating 126 receives and diffracts light from the third projector 122. The diffracted light travels within the first waveguide stack 104 towards the output structure 108. Light is coupled out of the first waveguide stack 104 by the output structure 108 in order to provide augmented reality or virtual reality images. Thus, the output structure 108 couples light towards a user from the first projector 102 and the third projector 122. The configuration is chosen so that light from the first and third projectors 102, 122 does not interact with the input grating 106, 126 for the other projector as this would create undesirable image features.

Figure 4A:
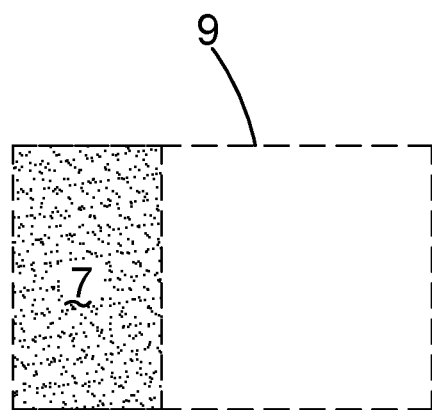
FIG. 4A is a diagram showing the angular field of view for light emanating from the first projector shown in FIG. 3.

FIG. 4A is a diagram showing the first range of angles 7 which are provided from the output structure 108 in the first waveguide stack 104, and which are formed of light emitted by the first projector 102. Like FIG. 2A, the first range of angles 7 is provided towards the left of the visible field of view, with a vertical angular range of ±24 degrees and a horizontal angular range between around −37 degrees and −5 degrees.

Figure 4B:
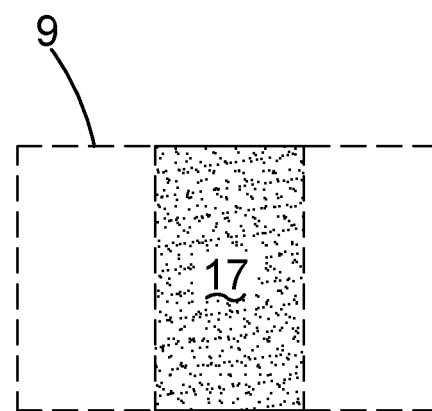
FIG. 4B is a diagram showing the angular field of view for light emanating from the second projector shown in FIG. 3.

FIG. 4B is a diagram showing the second range of angles 17 which are provided from the output structure 118 in the second waveguide stack 104. The second range of angles 17 is provided centrally within the user's field of view 109, with a vertical angular range of ±24 degrees and a horizontal angular range between around ±16 degrees. The second range of angles 17 is therefore partially overlapping with the first range of angles 7 between −5 degrees and −16 degrees.

Figure 4C:
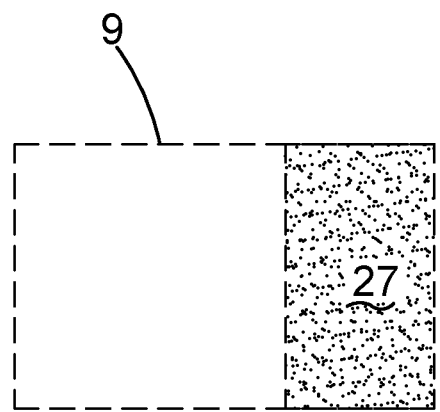
FIG. 4C is a diagram showing the angular field of view for light emanating from the third projector shown in FIG. 3.

FIG. 4C is a diagram showing the third range of angles 27 which are provided from the output structure 108 in the first waveguide stack 104, and which are formed of light emitted by the third projector 122. The third range of angles 27 is provided to the right of the user's field of view. The vertical angular range of ±24 degrees and the horizontal angular range is between around +5 to +37 degrees. The third range of angles 27 is therefore partially overlapping with the second range of angles 17 between +5 degrees and +16 degrees.

The third range of angles 27 in FIG. 4C is larger, both in horizontal and vertical extent, than the third range of angles 27 in FIG. 2C. This effect is created because the third projector 122 is angled away from the output structure 108 in FIG. 3, whereas the third projector 22 is angled towards the output structure 28 in FIG. 1.

Figure 5:
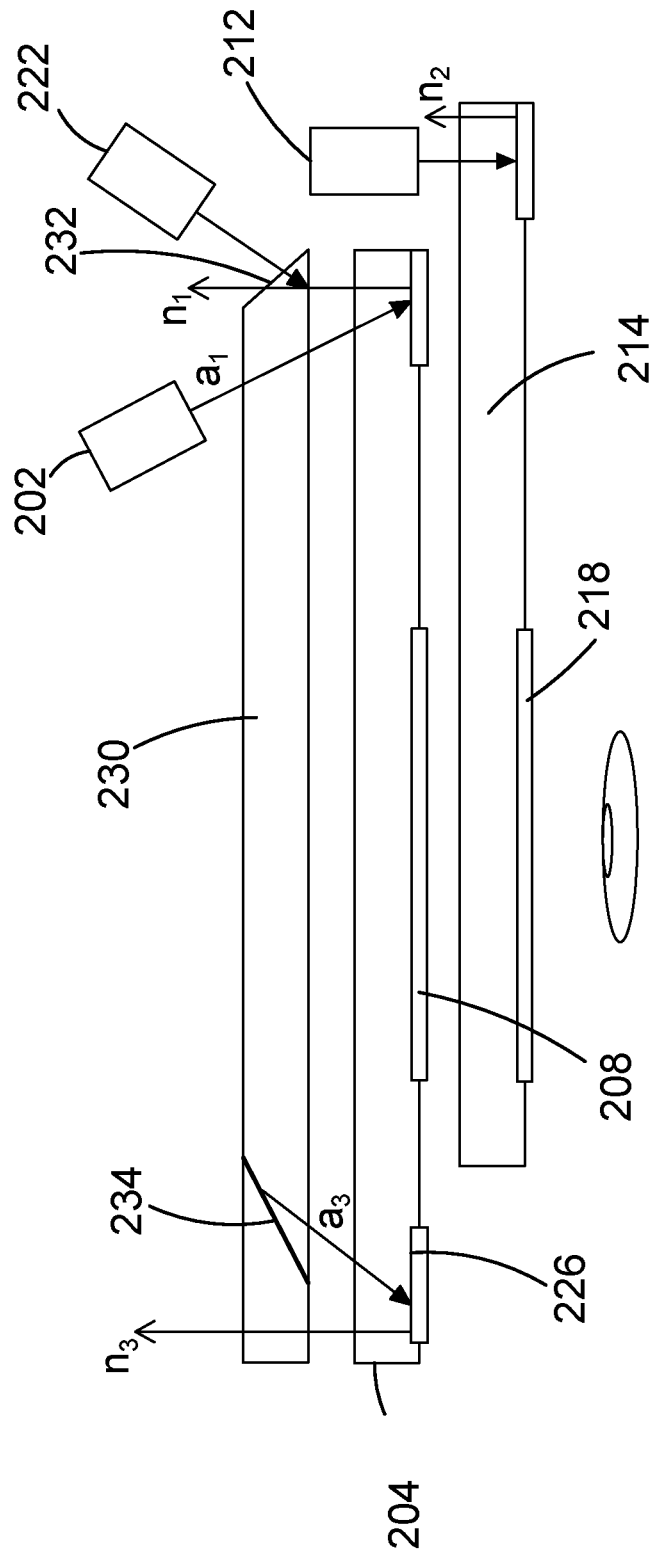
FIG. 5 is a schematic side view of an optical set up in an augmented reality display in another embodiment of the invention.

A potential difficulty arises with the arrangement depicted in FIG. 3 when it is implemented in an augmented reality headset. This issue arises because the output structures 108, 118 must be positioned in front of a user's eyes, which means that the first and second projectors 102, 112 can be positioned to the side of a user's head, whereas the third projector 122 must be positioned towards the bridge of a user's nose. This may create challenges in some circumstances because it means that electrical components need to be positioned in more than one location which can increase obscuration of a user's face and potentially increase the number of positions in which electrical components can interfere with a user's peripheral vision. FIG. 5 is a schematic side view of an optical set up in another configuration for use in an augmented reality display, and which is designed to mitigate some of these issues.

In the arrangement in FIG. 5 there are two waveguide stacks: a first waveguide stack 204 and a second waveguide stack 214. The first and second projectors 202, 212 are positioned in a substantially similar manner to the arrangements depicted in FIGS. 1 and 3. The third projector 222 is directed towards a periscope 230 having reflective surfaces oriented so that light is coupled out of the periscope 230 in the same direction as it is coupled in. The third projector 222 is oriented to project light in a direction that is orthogonal to an angled input surface 232 of the periscope 230. Light from the third projector 222 is then totally internally reflected within the periscope 230 until it encounters an angled reflective surface 234 that couples the light out of the periscope and towards an input grating 226 in or on the first waveguide stack 204. Light is coupled from the periscope 230 towards the input grating 226 so that the beam of light subtends an angle $a_3$ to the waveguide normal vector, $n_3$. The angle $a_3$ is within the range of 5-25 degrees, measured in a clockwise direction from the waveguide normal vector. Like the embodiment shown in FIG. 3, the light directed towards the input grating 226 (from the reflective surface 234 in the periscope 230) is angled away from the output structure 208.

FIGS. 4A-C show the first, second and third range of angles 107, 117, 127 which are provided from the output structures 208, 218, and which are formed respectively of light emitted by the first, second and third projectors 202, 212, 222. In this way, the range of angles output from the optical arrangement in FIG. 5 is the same as the range of angles output from the optical arrangement in FIG. 3. However, in the FIG. 5 configuration all of the projectors 202, 212, 222 can be grouped in a similar position, to one side of the output structures 208, 218. In an augmented reality device this is important because it can allow all of the light engines to be provided to one side of the headset, to the side of a user's head adjacent their temple where space for these components is available.

Figure 6:
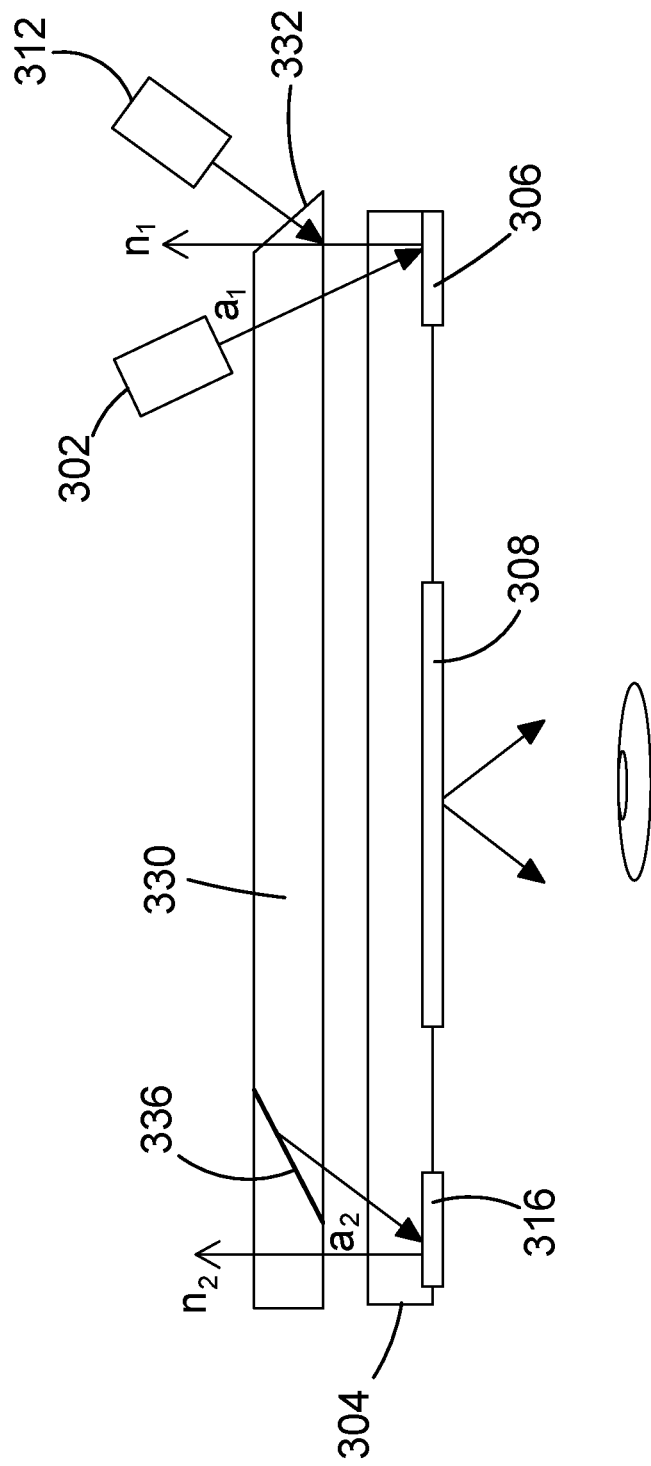
FIG. 6 is a schematic side view of an optical set up in an augmented reality display in another embodiment of the invention.

FIG. 6 is a schematic side view of an optical set up in another configuration for use in an augmented reality display. In this arrangement there is only one waveguide stack, referred to as a first waveguide stack 304.

A first projector 302 is configured to direct light so that the beam of light from the first projector subtends an angle $a_1$ to the waveguide normal vector, $n_1$. The angle $a_1$ is within the range of 5-25 degrees, measured in a counter-clockwise direction from the waveguide normal vector, $n_1$. Using different terminology, the angle $a_1$ may be expressed as a negative angle in the range from −25 degrees to −5 degrees. The input grating 306 receives and diffracts light from the first projector 302. The diffracted light travels within the first waveguide stack 304 by total internal reflection towards the output structure 308. Light is coupled out of the first waveguide stack 304 by the output structure 308 in order to provide augmented reality or virtual reality images. The output structure 308 provides augmented reality images within a first range of angles for light that has originated with the first projector 302.

Figure 7A:
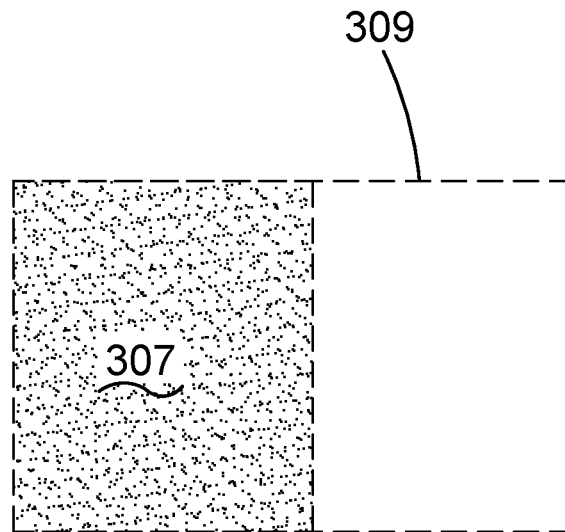
FIG. 7A is a diagram showing the angular field of view for light emanating from the first projector shown in FIG. 6.

FIG. 7A is a diagram showing the first range of angles 307 which are provided from the output structure 308 in the first waveguide stack 304 for light emanating from the first projector 302. The first range of angles 307 is provided towards the left of the visible field of view, with a vertical angular range of ±24 degrees and a horizontal angular range between around −38 degrees to +1 degrees. In this way, the first projector 302 can position augmented reality images within the first range of angles 307, which are provided towards the left hand side of the user's field of view 309.

The second projector 312 is directed towards a periscope 330 having reflective surfaces oriented so that light is coupled out of the periscope 330 in the same direction as it is coupled in. Light is coupled from the periscope 330 towards the input grating 316 so that the beam of light subtends an angle $a_2$ to the waveguide normal vector, $n_2$. The angle $a_2$ is within the range of 5-25 degrees, measured in a clockwise direction from the waveguide normal vector. Like the embodiment shown in FIGS. 3 and 5, the light directed towards the input grating 316 (from the reflective surface 234 in the periscope 230) is angled away from the output structure 308.

Figure 7B:
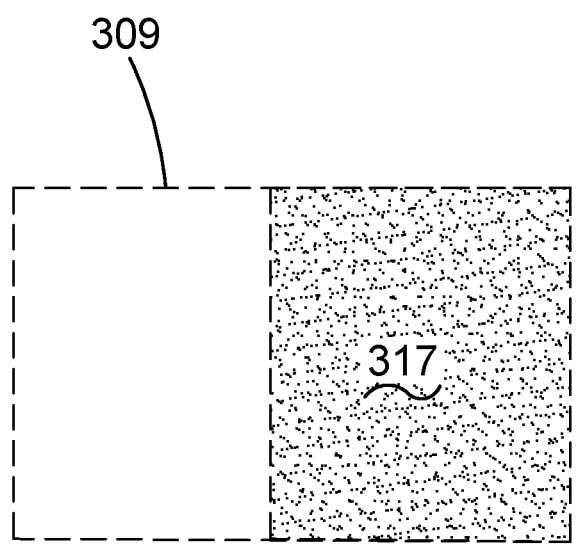
FIG. 7B is a diagram showing the angular field of view for light emanating from the second projector shown in FIG. 6.

FIG. 7B is a diagram showing the second range of angles 317 which are provided from the output structure 308 in the first waveguide stack 304 for light emanating from the second projector 312. The second range of angles 317 is provided towards the right of the visible field of view, with a vertical angular range of ±24 degrees and a horizontal angular range between around −1 degrees to +38 degrees. In this way, the second projector 312 can position augmented reality images within the first range of angles 317, which are provided towards the right hand side of the user's field of view 309. The first range of angles 307 and the second range of angles are partially overlapping, and an overlap region is provided between ±1 degrees. In this way, it is possible to stitch together the first and second ranges of angles to provide augmented reality images within ±38 degrees horizontally and ±24 degrees vertically, which represents a large extent of a user's field of view. In the arrangement of FIG. 6 this can be achieved using a single waveguide stack, which offers advantages in terms of thickness of display and weight.

Figure 8:
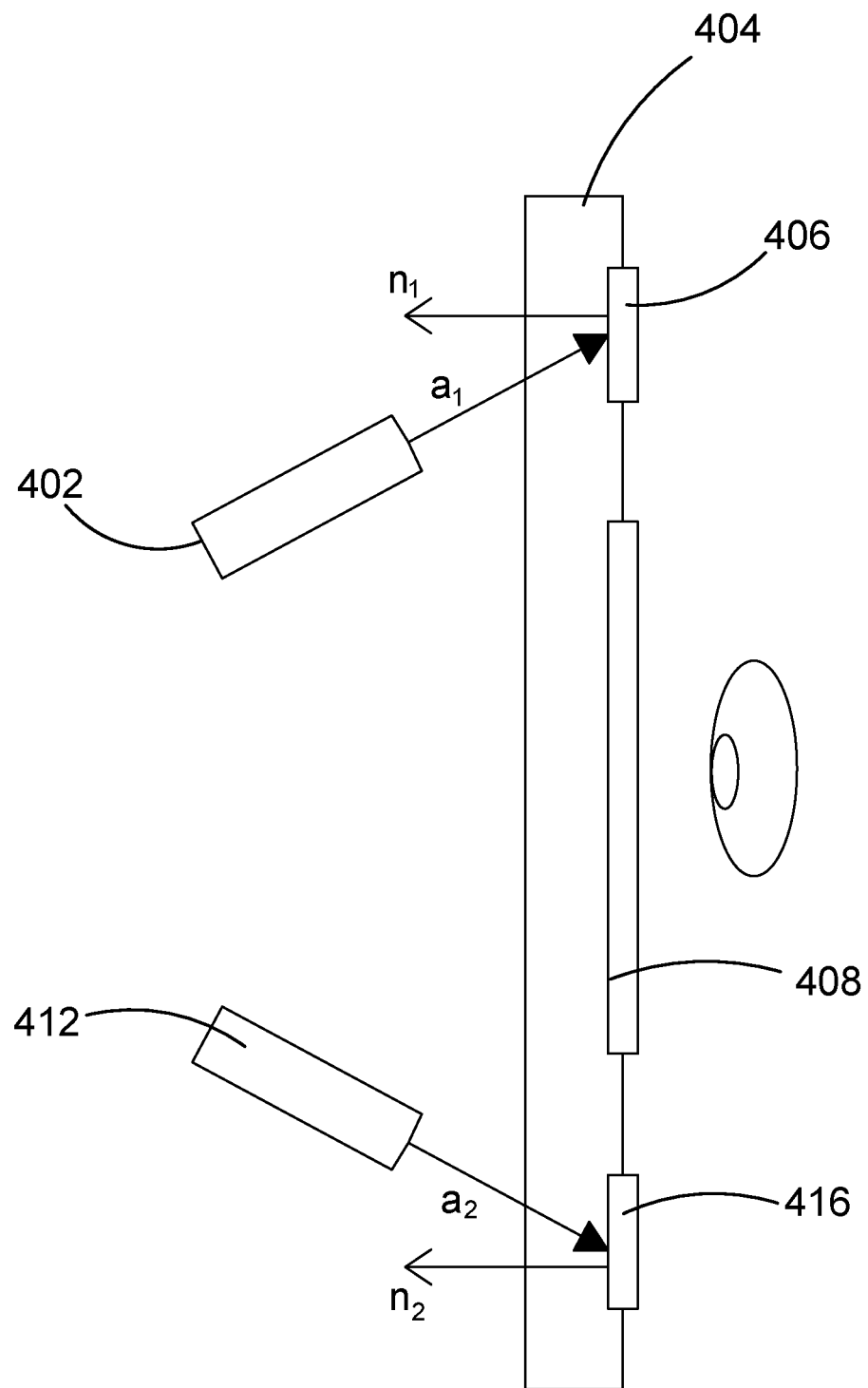
FIG. 8 is a schematic side view of an optical set up in an augmented reality display in another embodiment of the invention.

FIG. 8 is a schematic side view of an optical set up in another configuration for use in an augmented reality display. This arrangement demonstrates how augmented reality images can be stitched together to enhance the effective vertical field of view. A first projector 402 is oriented away from an output structure 408 to project light towards an input grating 406. The light beam from the first projector 402 subtends an angle $a_1$ to the waveguide normal vector, $n_1$. The angle $a_1$ is within the range of 5-25 degrees, measured in a counter-clockwise direction from the waveguide normal vector, $n_1$.

Figure 9A:
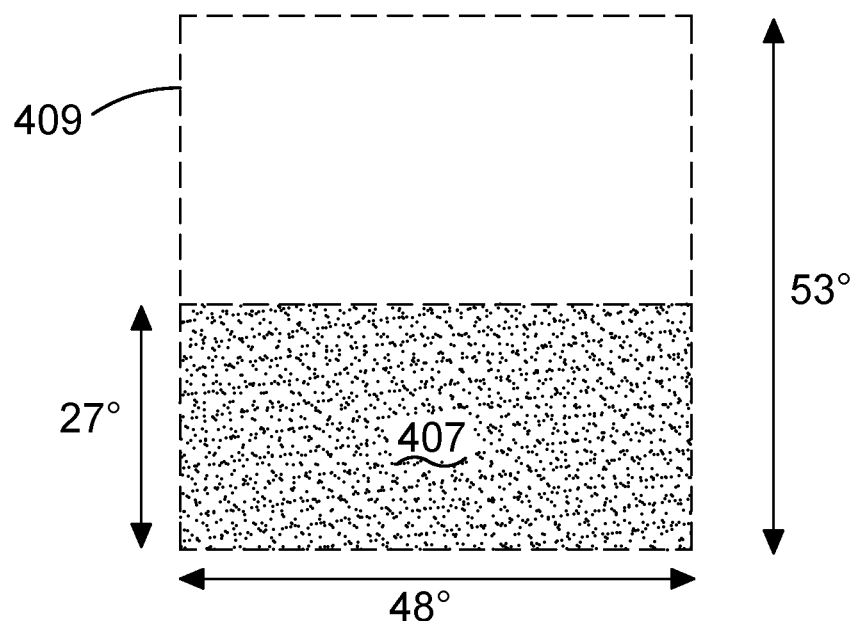
FIG. 9A is a diagram showing the angular field of view for light emanating from the first projector shown in FIG. 8.

The output structure 408 provides augmented reality images within a first range of angles 407 for light that has originated with the first projector 402. FIG. 9A is a diagram showing the first range of angles 407 which are provided from the output structure 408 in the first waveguide stack 404 for light emanating from the first projector 402. The first range of angles 407 is provided towards the lower portion of the visible field of view, with a horizontal range of ±24 degrees and a vertical angular range from +1 degrees to −26 degrees. In this way, the first projector 402 can position augmented reality images within the first range of angles 407, which are provided in the lower portion of the user's field of view 409.

A second projector 412 is also oriented away from the output structure 408 to project light towards an input grating 416. The input grating 416 is located on the opposite side of the output structure 408 to the input grating 406 for the first projector 402. The light beam from the second projector 412 subtends an angle $a_2$ to the waveguide normal vector, $n_2$. The angle $a_1$ is within the range of 5-25 degrees.

Figure 9B:
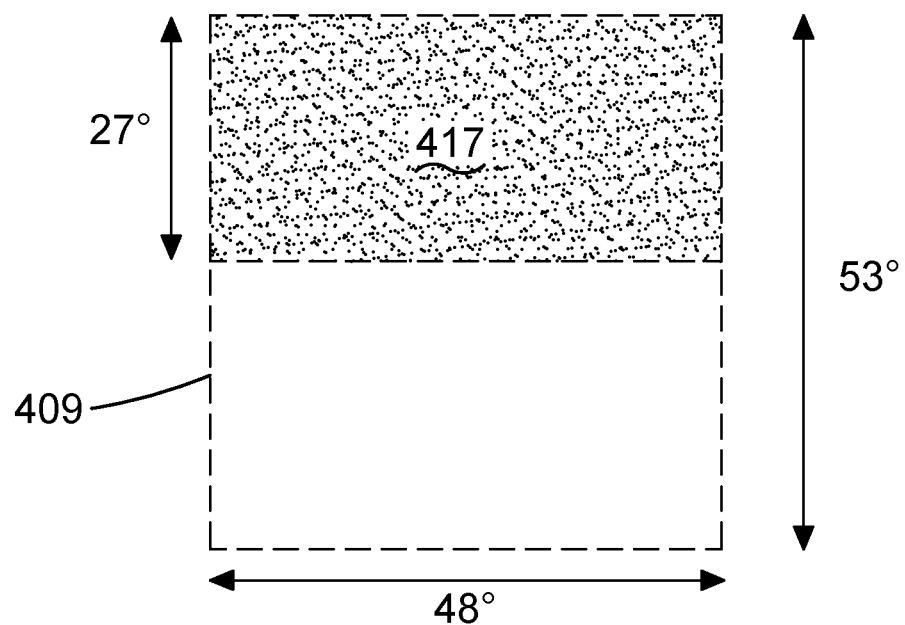
FIG. 9B is a diagram showing the angular field of view for light emanating from the second projector shown in FIG. 8.

The output structure 408 provides augmented reality images within a second range of angles 417 for light that has originated with the second projector 412. FIG. 9B is a diagram showing the second range of angles 417 which are provided from the output structure 408 in the first waveguide stack 404 for light emanating from the second projector 412. The second range of angles 417 is provided towards the upper portion of the visible field of view, with a horizontal range of ±24 degrees and a vertical angular range from −1 degrees to +26 degrees. In this way, the first projector 402 can position augmented reality images within the second range of angles 417, which are provided in the upper portion of the user's field of view 409. The first and second ranges of angles 407, 417 are partially overlapping in the region between ±1 degrees vertically. This can allow the two angular ranges to be stitched together, providing an increased field of view for a user.

Figure 10:
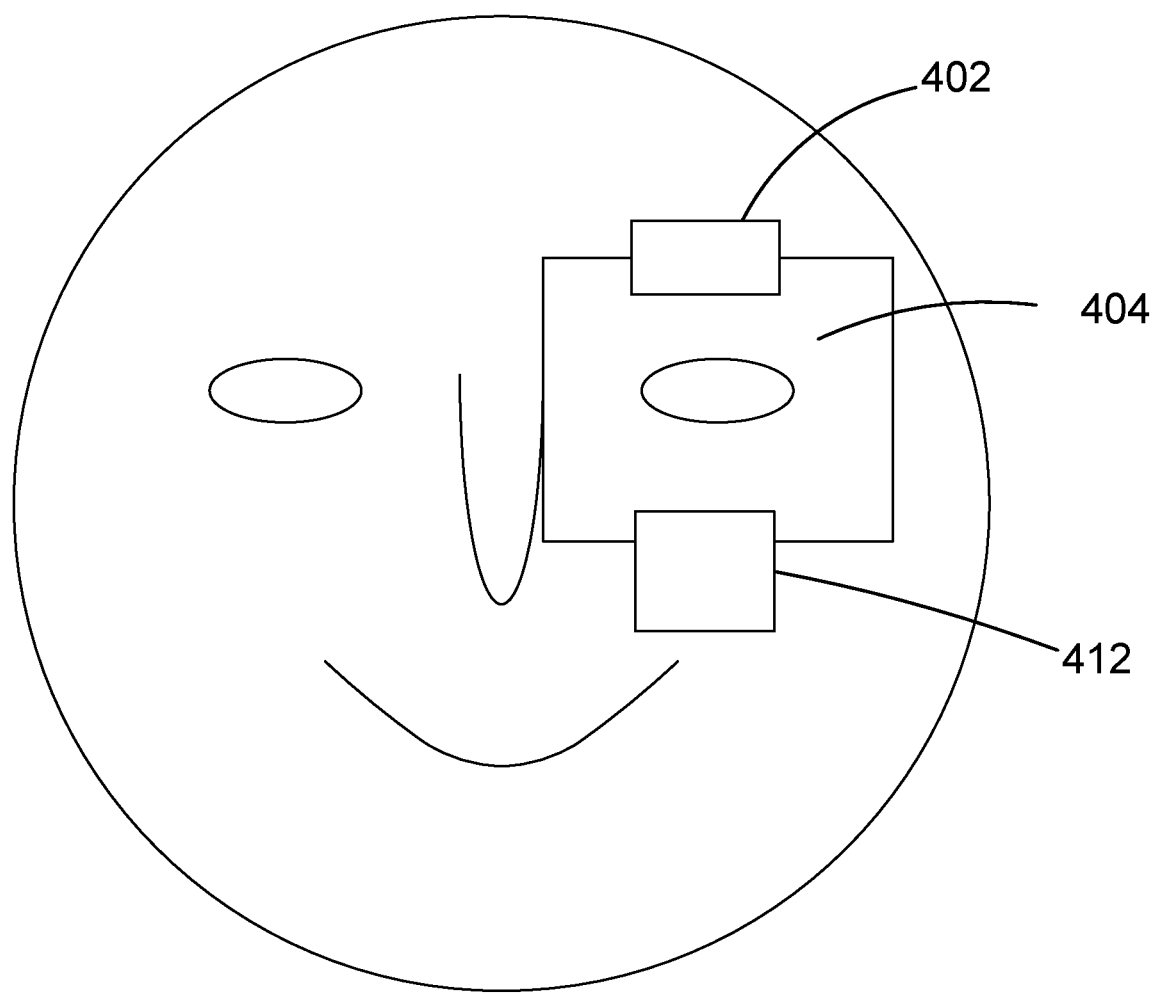
FIG. 10 is a schematic diagram showing where the first and second projectors depicted in FIG. 8 can be positioned with respect to a user's head.

FIG. 10 is a schematic diagram showing where the first and second projectors 402, 412 can be positioned with respect to a user's head. The first projector 402 can be positioned above a user's eye, adjacent their brow. The second projector 412 can be positioned below the user's eye, adjacent their cheek.

Figure 11:
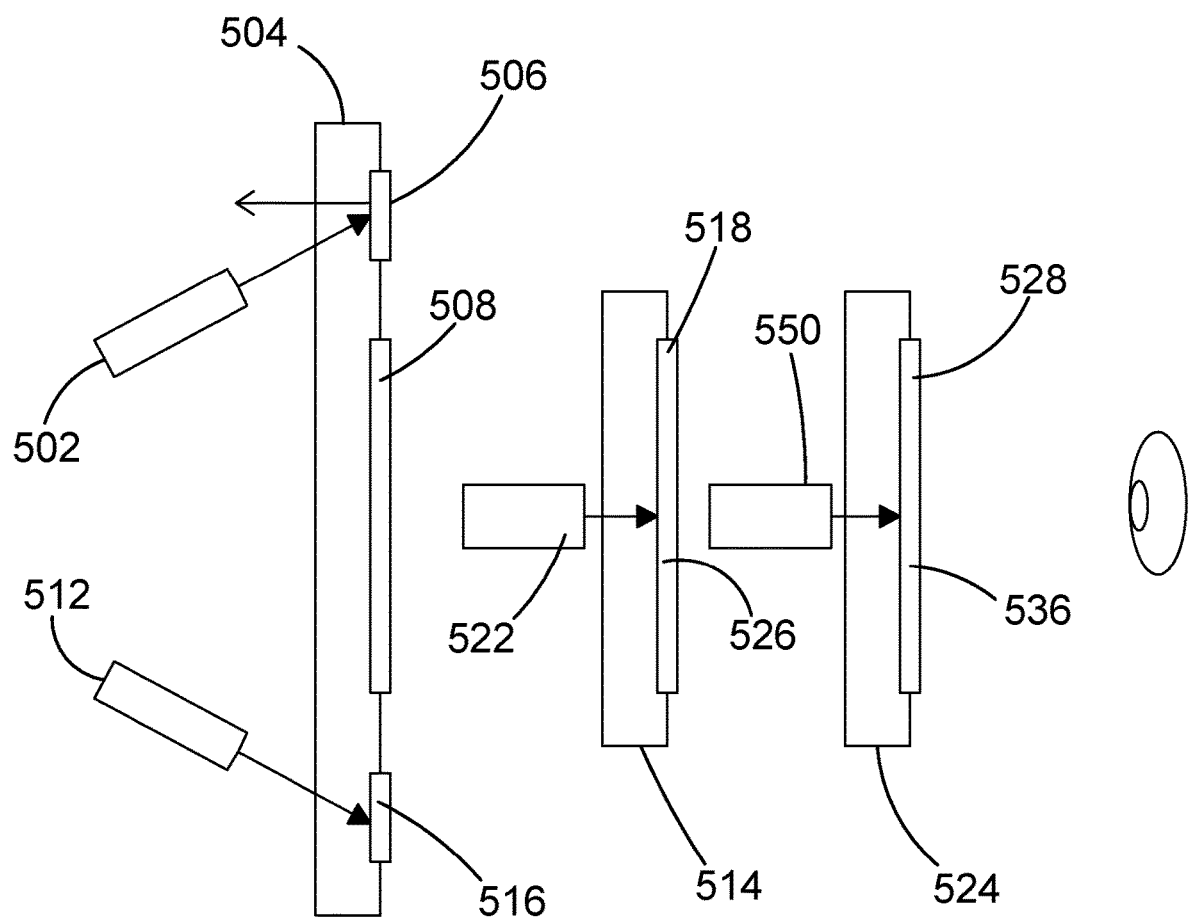
FIG. 11 is a schematic side view of an optical set up in an augmented reality display in another embodiment of the invention.
Figure 12:
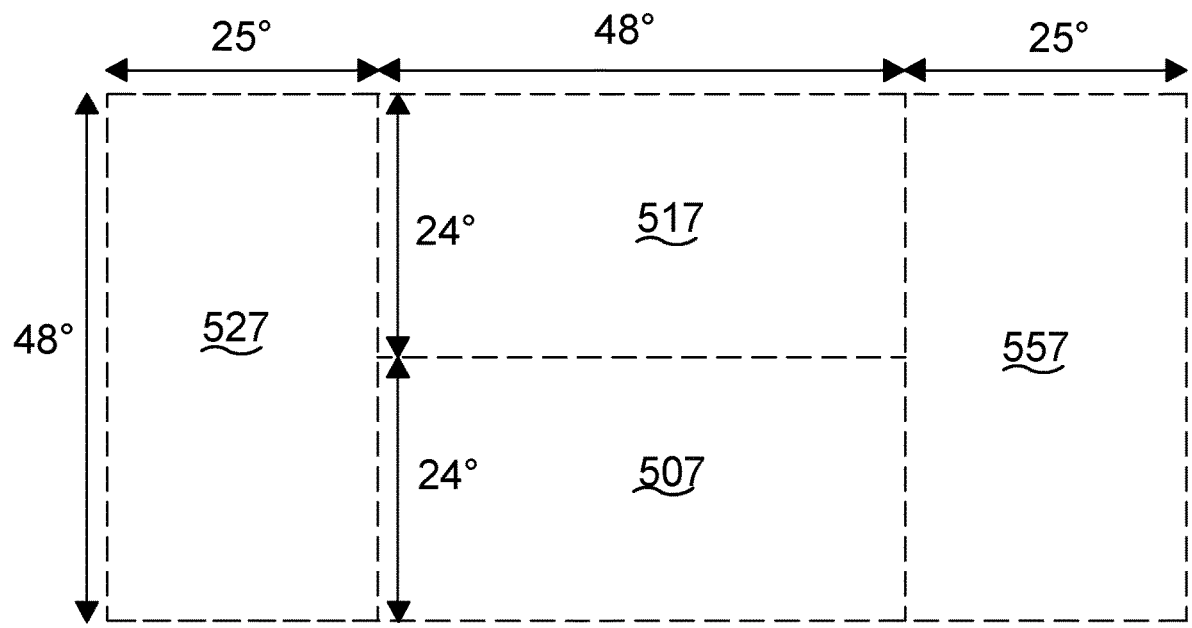
FIG. 12 is a diagram showing the angular fields of view for light emanating from the first, second, third and fourth projectors shown in FIG. 11.

FIG. 11 is a schematic side view of an optical set up in another configuration for use in an augmented reality display. This arrangement demonstrates how augmented reality images can be stitched together to enhance the effective vertical and horizontal fields of view. In this arrangement first and second projectors 502, 512 are configured with respect to a first waveguide stack 504 in the manner described above, with reference to FIG. 8. With reference to FIG. 12, this provides a first range of angles 507 positioned in the lower portion of a user's field of view, and a second range of angles 517, partially overlapping with the first range of angles 507, positioned in the upper portion of the user's field of view.

In addition, the arrangement in FIG. 11 includes a third projector 522 and a fourth projector 550. The third projector 522 is directed towards an input grating 526 in a second waveguide stack 514. Light from the third projector 522 is diffracted by the input grating 526 and totally internally reflected within the second waveguide stack 514 to an output structure 518 which couples light out of the second waveguide stack 514 in a third range of angles 527. The third projector is angled in order to provide the third range of angles 527 towards the left of the user's field of view, and partially overlapping with the first and second ranges of angles 507, 517. This can be achieved in a number of ways, as described above. For example, it may be accomplished using a third projector 522 configured similarly to the first projector 302 in FIG. 6.

The fourth projector 550 is directed towards an input grating 536 in a third waveguide stack 524. Light from the fourth projector 550 is diffracted by the input grating 536 and totally internally reflected within the third waveguide stack 524 to an output structure 528 which couples light out of the third waveguide stack 524 in a fourth range of angles 557. The fourth projector 550 is angled in order to provide the fourth range of angles 557 towards the right of the user's field of view, and partially overlapping with the first and second ranges of angles 507, 517. This can be achieved in a number of ways, as described above. For example, it may be accomplished using a fourth projector 550 configured similarly to the second projector 312 in FIG. 6.

As can be appreciated from FIG. 12, the first, second, third and fourth ranges of angles 507, 517, 527, 557 can therefore be stitched together in order to create an effective field of view for augmented reality images between ±24 degrees vertically and ±49 degrees horizontally.

Figure 13:
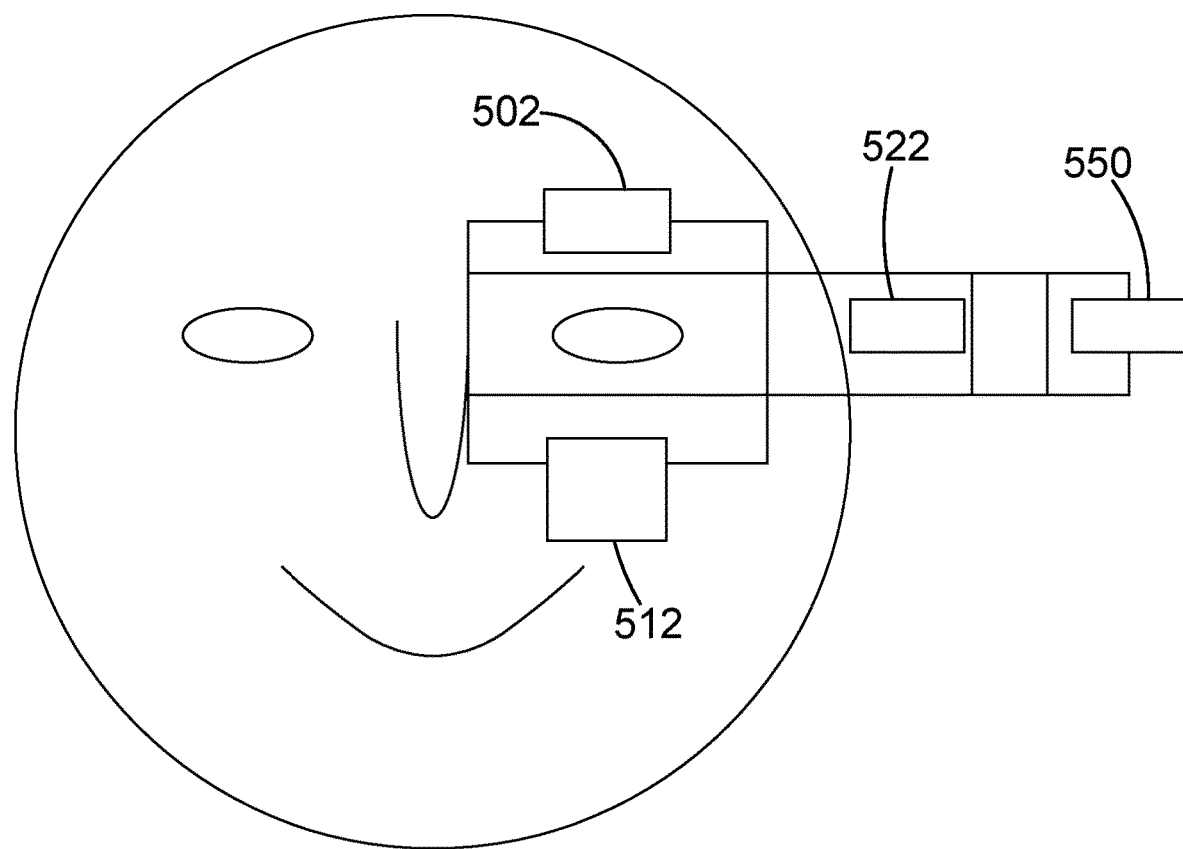
FIG. 13 is a schematic diagram showing where the first, second, third and fourth projectors depicted in FIG. 11 can be positioned with respect to a user's head.

FIG. 13 is a schematic diagram showing where the first, second, third and fourth projectors 502, 512, 522, 550 can be positioned with respect to a user's head. The first projector 502 can be positioned above a user's eye, adjacent their brow. The second projector 512 can be positioned below the user's eye, adjacent their cheek. The third and fourth projectors 522, 550 can be positioned to the side of a user's head.

Figure 14A:
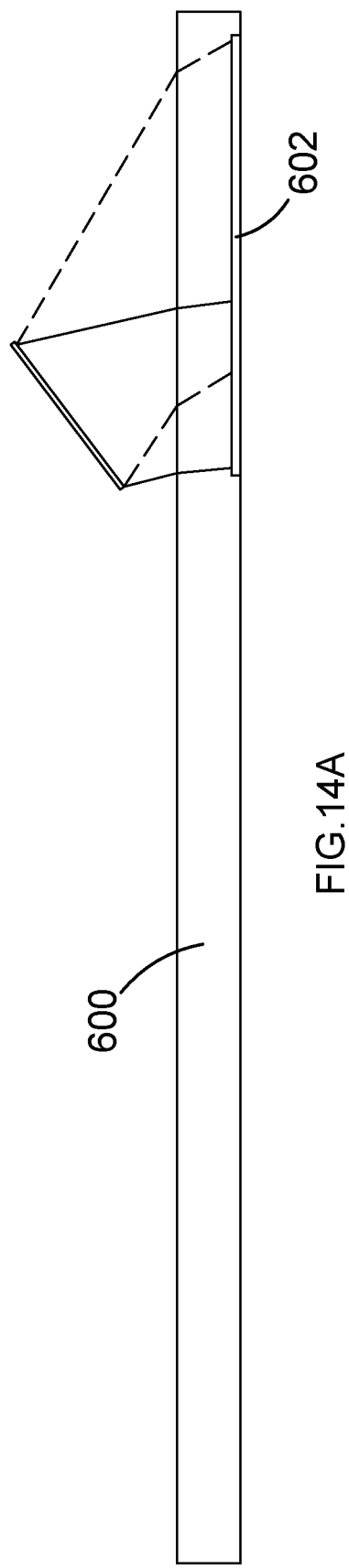
FIG. 14A is a side view of a waveguide in one arrangement.

FIG. 14A is a side view of a waveguide 600 where light is injected into the waveguide at an angle to the surface normal vector. Light is provided to the waveguide 600 so that it can be coupled into the waveguide by an input diffraction grating 602 provided on a rear surface. As shown in FIG. 14A, a spread of angles is provided within a solid angle in the input beam. These light rays are refracted on interaction with the waveguide 600. The spread of refracted angles means that a minimum size is provided for the input diffraction grating 602 so that all of the refracted rays are effectively diffracted. In some configurations the physical size of the input diffraction grating 602 can introduce issues because some of the diffracted rays will re-interact with the input grating, following initial diffraction. This can cause undesirable viewing features.

Figure 14B:
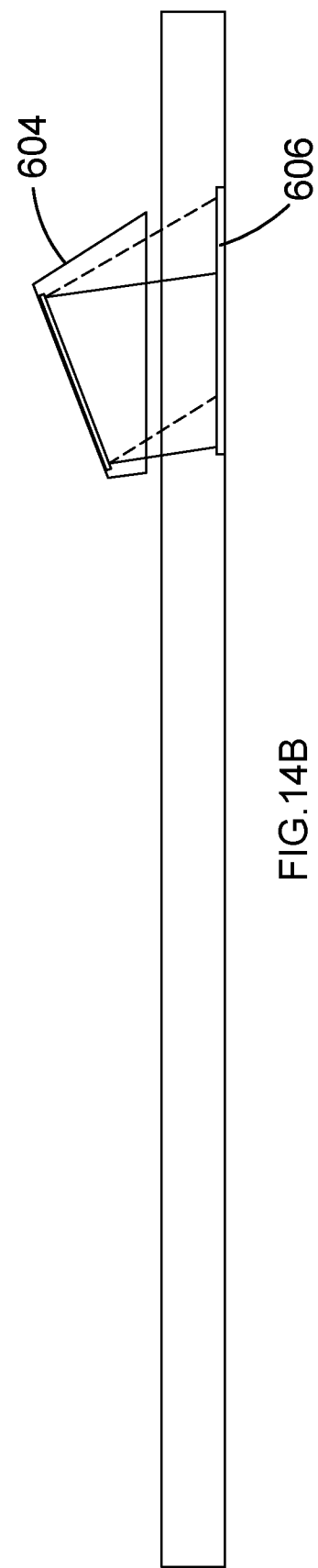
FIG. 14B is a side view of a waveguide in another configuration in an embodiment of the invention.

FIG. 14B is a side view of the waveguide 600 where a prism 604 is provided between a projector and the waveguide 600. The prism 604 provides an initial refraction of light from the projector, before it encounters the waveguide 600 in order to reduce the spread of angles in the input beam. This can advantageously allow use of an input diffraction grating 606 that has a reduced physical size. This is advantageous because the input diffraction grating 606 can diffract received light so that it does not re-interact with the input diffraction grating 606, but is totally internally reflected within the waveguide 600 for further interaction with another diffractive feature such as an output structure (not shown). A prism like this can be used in any of the embodiments described above in order to reduce the physical size of an input grating and improve quality in an augmented reality image.

The invention claimed is:

1. An augmented reality or virtual reality display device, comprising:
   a first projector and a second projector;
   at least one waveguide assembly, comprising at least one waveguide;
   a first input diffractive optical element positioned in or on the at least one waveguide assembly configured to receive light from the first projector and to couple the light into the at least one waveguide;
   a second input diffractive optical element positioned in or on the at least one waveguide assembly configured to receive light from the second projector and to couple the light into the at least one waveguide;
   an output diffractive optical element positioned in or on the at least one waveguide assembly configured to couple light out of the at least one waveguide towards a notional viewing position;
   wherein the first projector is configured to provide light to the first input diffractive optical element in a direction that is at a first angle to a waveguide normal vector, and the second projector is configured to provide light to the second input diffractive optical element in a direction that is at a second angle to the waveguide normal vector;
   wherein the output diffractive optical element is configured to couple light out of the at least one waveguide in a first range of angles for light from the first projector and in a second range of angles for light from the second projector, wherein the first range of angles and the second range of angles are different but are partially overlapping; and
   wherein the first and second angles are angled respectively away from the output diffractive optical element.

2. The display device of claim 1, wherein the at least one waveguide assembly comprises a first waveguide assembly and a second waveguide assembly, respectively comprising at least one waveguide, and wherein the first input diffractive optical element is configured to couple light from the first projector into the at least one waveguide in the first waveguide assembly and the second input diffractive optical element is configured to couple light from the second projector into the at least one waveguide in the second waveguide assembly.

3. The display device of claim 2, wherein the first waveguide assembly is a stack of waveguides and wherein there is a plurality of first input diffractive optical elements respectively positioned in or on each waveguide in the stack of waveguides, and wherein the first projector is configured to provide a plurality of wavelengths of light which are coupled by the plurality of first input diffractive optical elements into the stack of waveguides.

4. The display device of claim 3, wherein the second waveguide assembly is a stack of waveguides and wherein there is a plurality of second input diffractive optical elements respectively positioned in or on each waveguide in the stack of waveguides, and wherein the second projector is configured to provide a plurality of wavelengths of light which are coupled by the plurality of second input diffractive optical elements into the stack of waveguides.

5. The display device of claim 1, comprising a third projector configured to provide light to a third input diffractive optical element in a direction that is at a third angle to a waveguide normal vector, and wherein the output diffractive optical element is configured to couple light out of the at least one waveguide in a third range of angles for light from the third projector, wherein the second range of angles and the third range of angles are partially overlapping.

6. The display device of claim 2, wherein the first and second projectors are positioned so that they provide light directly to first and second waveguide assemblies.

7. The display device of claim 6, wherein the first and second input diffractive optical elements are offset from one another in the first and second waveguide assemblies so that light can be coupled directly from the first and second projectors to the first and second input diffractive optical elements respectively.

8. The display device of claim 1, wherein the first and second input diffractive optical elements are positioned in or on the at least one waveguide assembly on either side of the output diffractive optical element.

9. The display device of claim 8, comprising a periscope for coupling light from the first projector to the first input diffractive optical element so that the first projector and the second projector can be positioned on the same side of the output diffractive optical element.

10. The display device of claim 8, wherein the first and second input diffractive optical elements are positioned above and below the output diffractive optical element from the perspective of a user.

11. The display device of claim 8, wherein the first and second input diffractive optical elements are positioned to the left and right of the output diffractive optical element from the perspective of a user.

12. The display device of claim 11, further comprising a third projector and a fourth projector, and a third input diffractive optical element and a fourth input diffractive optical element, wherein the third and fourth input diffractive optical elements are positioned above and below the output diffractive optical element from the perspective of a user.

13. The display device of claim 1, further comprising a prism positioned between the first projector and the at least one waveguide assembly to reduce the spread of angles of light rays from the first projector where they encounter the at least one waveguide assembly.

14. The display device of claim 9, wherein the first and second input diffractive optical elements are positioned above and below the output diffractive optical element from the perspective of a user.

15. The display device of claim 9, wherein the first and second input diffractive optical elements are positioned to the left and right of the output diffractive optical element from the perspective of a user.

16. A method for projecting light via an augmented reality or virtual reality display device, comprising:
 projecting light from a first projector;
 directing the light from the first projector toward a first input diffractive optical element positioned in or on at least one waveguide assembly having at least one waveguide in a direction that is at a first angle to a waveguide normal vector;
 coupling the light from the first projector into at the least one waveguide;
 projecting light from a second projector;
 directing the light from the second projector toward a second input diffractive optical element positioned in or on the at least one waveguide assembly in a direction that is at a second angle to the waveguide normal vector;
 coupling the light from the second projector into the at least one waveguide; and
 coupling light out of the at least one waveguide towards a notional viewing position via an output diffractive optical element positioned in or on the at least one waveguide assembly;
 wherein the output diffractive optical element is configured to couple light out of the at least one waveguide in a first range of angles for light from the first projector and in a second range of angles for light from the second projector, wherein the first range of angles and the second range of angles are different but are partially overlapping; and
 wherein the first and second angles are angled respectively away from the output diffractive optical element.

17. The method of claim 16, wherein the at least one waveguide assembly comprises a first waveguide assembly and a second waveguide assembly, respectively comprising at least one waveguide, and wherein the first input diffractive optical element is configured to couple light from the first projector into the at least one waveguide in the first waveguide assembly and the second input diffractive optical element is configured to couple light from the second projector into the at least one waveguide in the second waveguide assembly.

18. The method of claim 17, wherein the first waveguide assembly is a stack of waveguides and wherein there is a plurality of first input diffractive optical elements respectively positioned in or on each waveguide in the stack of waveguides, and wherein the first projector is configured to provide a plurality of wavelengths of light which are coupled by the plurality of first input diffractive optical elements into the stack of waveguides.

19. The method of claim 18, wherein the second waveguide assembly is a stack of waveguides and wherein there is a plurality of second input diffractive optical elements respectively positioned in or on each waveguide in the stack of waveguides, and wherein the second projector is configured to provide a plurality of wavelengths of light which are coupled by the plurality of second input diffractive optical elements into the stack of waveguides.

20. The method of claim 16, further comprising:
 projecting light from a third projector; and directing the light from the third projector to a third input diffractive optical element in a direction that is at a third angle to a waveguide normal vector;

wherein the output diffractive optical element is configured to couple light out of the at least one waveguide in a third range of angles for light from the third projector, wherein the second range of angles and the third range of angles are partially overlapping.

\* \* \* \* \*